(12) United States Patent
Wu et al.

(10) Patent No.: US 7,405,892 B2
(45) Date of Patent: Jul. 29, 2008

(54) LENS MODULE (75) Inventors: Chih-Meng Wu, Hsinchu (TW);
Tung-Hua Chou, Hsinchu (TW);
Chi-Yu Meng, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 0 days.

(21) Appl. No.: 11/747,809

(22) Filed: May 11, 2007

(65) Prior Publication Data
US 2008/0007846 A1  Jan. 10, 2008

(30) Foreign Application Priority Data
Jul. 5, 2006  (TW) .............................. 95124440 A (51) Int. Cl.
*G02B 7/02* (2006.01)
*G02B 15/14* (2006.01)

(52) U.S. Cl. ................. 359/824; 359/823; 359/814; 359/694; 310/12

(58) Field of Classification Search ................. 359/811, 359/814, 822–824, 694–698; 396/144, 217, 396/296; 310/12, 14, 15; 348/335
See application file for complete search history.

(56) References Cited
U.S. PATENT DOCUMENTS 4,519,691 A * 5/1985 Yamada et al. .............. 396/144
4,684,233 A * 8/1987 Kodaira et al. ................ 396/90
4,992,684 A    2/1991 Matsui
5,121,016 A    6/1992 Wachi
5,229,669 A * 7/1993 Takei .......................... 310/12
5,471,100 A * 11/1995 Sakamoto et al. ............. 310/12
5,706,272 A * 1/1998 Ezawa ........................ 720/676
5,939,804 A    8/1999 Nakao et al.

FOREIGN PATENT DOCUMENTS
TW          83100445          1/1994

* cited by examiner

*Primary Examiner*—Loha Ben
(74) *Attorney, Agent, or Firm*—J.C. Patents (57) ABSTRACT A lens module including a base, a sleeve, a lens, a magnetic permeable column, a coil supporter, a coil, and a magnet set is provided. A bottom of the base has a plurality of bumps. The sleeve is rotatably disposed on the bumps. The lens is disposed in the sleeve, and the magnetic permeable column is disposed beside the sleeve. The coil is disposed between two holes of the coil supporter. The magnetic permeable column is disposed through the holes and the coil. The magnet set is disposed beside the coil. The sleeve has a plurality of step portions and each bump contacts the corresponding step portion. When a current is provided to the coil, the electromagnetic force produced between the coil and the magnet set moves the coil along the magnetic permeable column, to push the coil supporter and accordingly rotate the sleeve coupled with the coil supporter.

19 Claims, 9 Drawing Sheets

FIG. 10D

LENS MODULE

CROSS-REFERENCE TO RELATED APPLICATION

This application claims the priority benefit of Taiwan application serial no. 95124440, filed Jul. 5, 2006. All disclosure of the Taiwan application is incorporated herein by reference.

BACKGROUND OF THE INVENTION

1. Field of the Invention

The present invention relates to a lens module. More particularly, the present invention relates to a zoom lens module.

2. Description of Related Art

Figure 1:
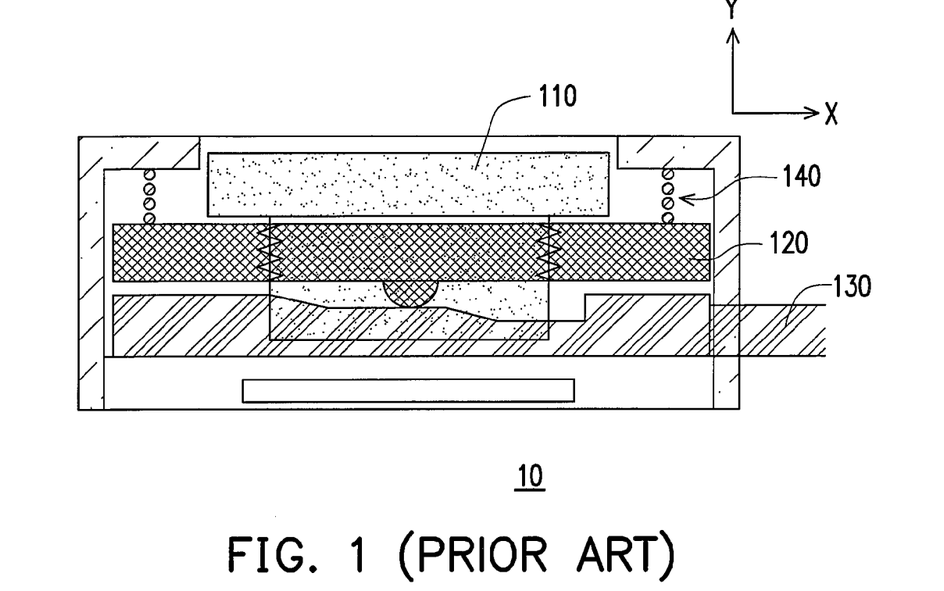
FIG. 1 is a diagram of a conventional manual focus lens module.

Referring to FIG. 1, in a conventional manual focusing lens module 10, a lens 110 is inserted into an internal ring 120, and the internal ring 120 is sustained between a focus-adjusting ring 130 and a spring 140. The focus-adjusting ring 130 has segmented steps, thus, when the focus-adjusting ring 130 is turned manually, the focus-adjusting ring 130 links the internal ring 120 and the lens 110 to move up and down along Y-axis to complete a focusing operation. However, the lens module 10 is not convenient to use because it focuses manually.

Figure 2:
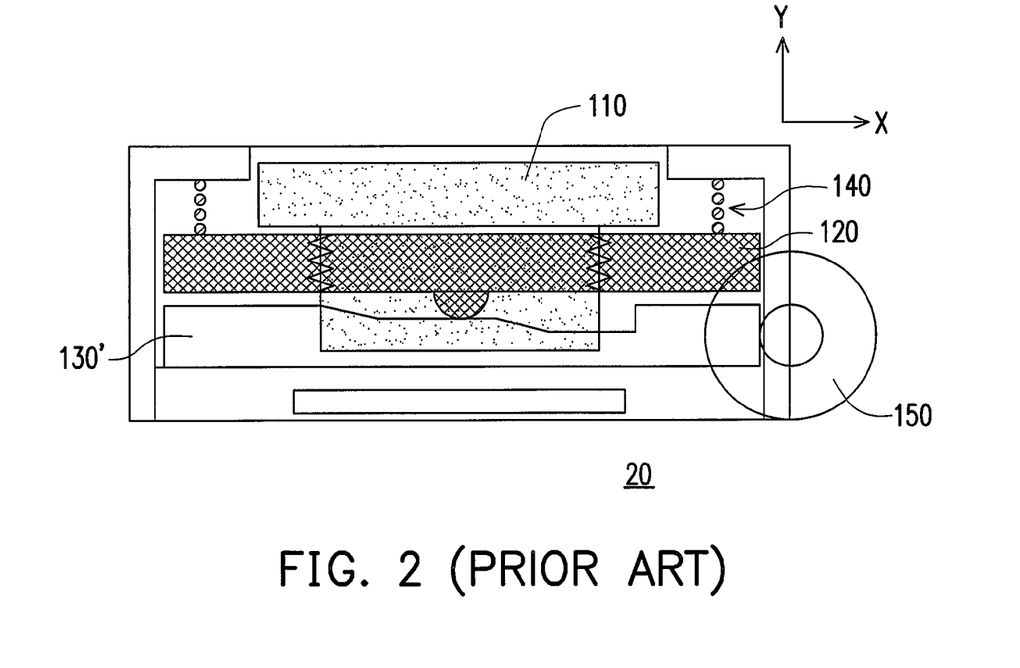
FIG. 2 is a diagram of a conventional lens module which focuses through a stepping motor.

Referring to FIG. 2, in a conventional lens module 20 which focuses through a stepping motor, a lens 110 is inserted into an internal ring 120, and the internal ring 120 is sustained between a focus-adjusting ring 130' and a spring 140. The focusing pattern of the lens module 20 is to control a stepping motor 150 electrically to drive a transmission mechanism, such as a screw rod, a turbine, a gear, or the focus-adjusting ring 130', so as to move the internal ring 120 and the lens 110 up and down along axis Y to complete a focusing operation. Even though the lens module 20 focus automatically, the lens module 20 has large size and high manufacturing cost, and the power consumption thereof for focusing is high.

Figure 3A:
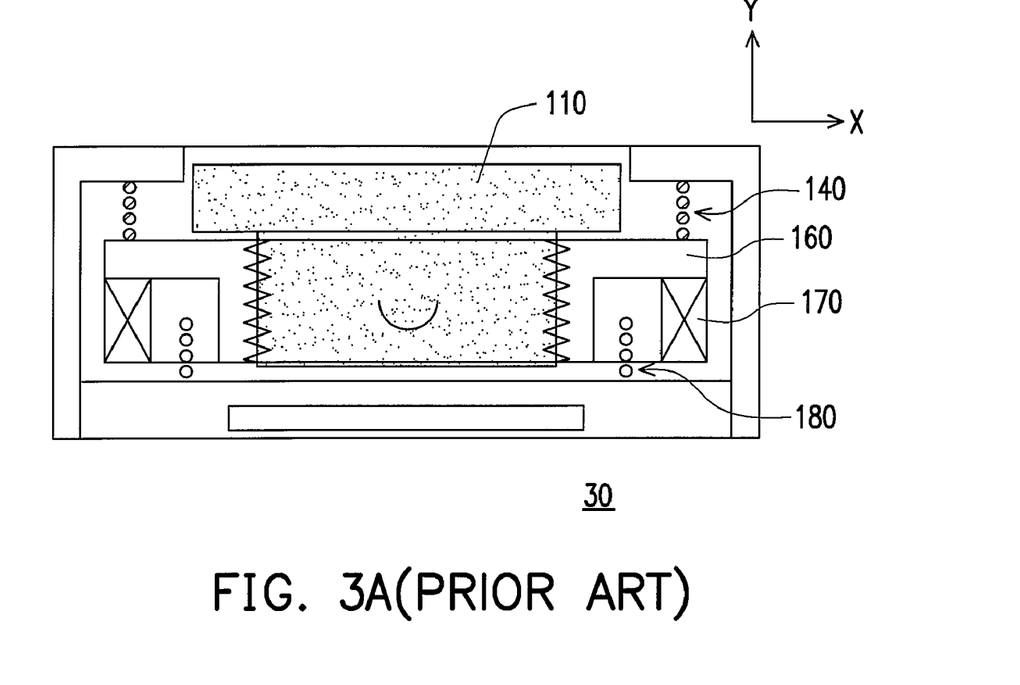
FIG. 3A and FIG. 3B are diagrams of two conventional lens modules which focus through voice coil motor.
Figure 3B:
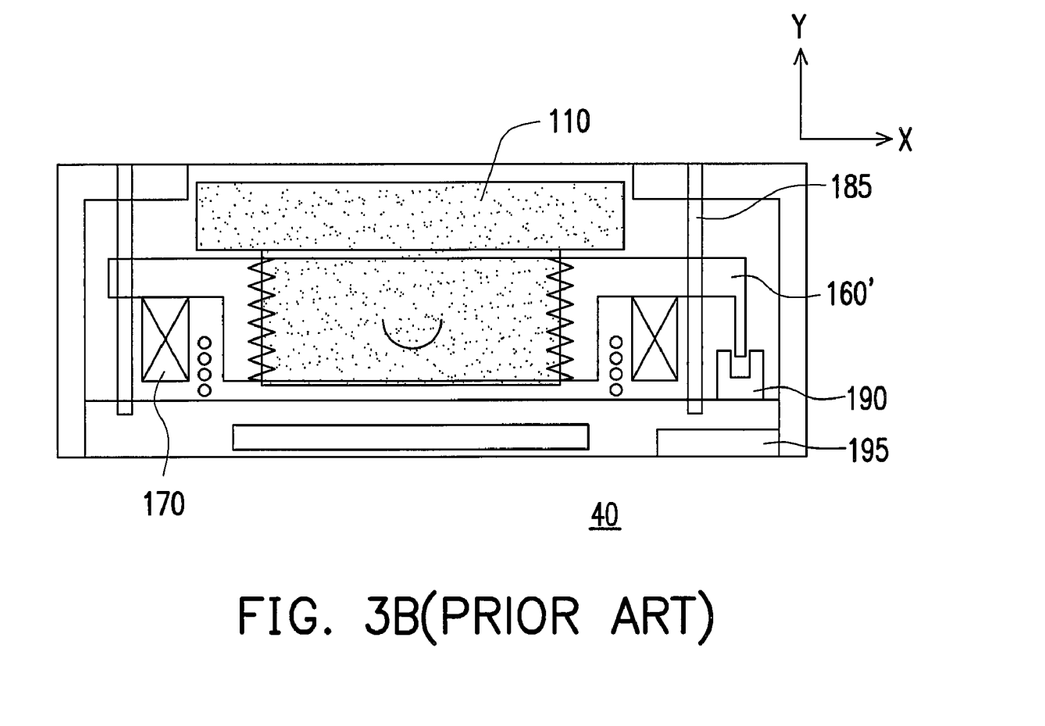

FIG. 3A and FIG. 3B are diagrams of two conventional lens modules which focus through voice coil motor. Referring to FIG. 3A first, in a lens module 30, a lens 110 is inserted into a magnetic permeable internal ring 160, and a magnet 170 is disposed at both sides of the magnetic permeable internal ring 160. Thus, the magnetic permeable internal ring 160 is prevented from moving about by the electromagnetic force produced between the magnet 170 and the magnetic permeable internal ring 160, so as to fix the position of the lens 110 on axis X. Besides, the focusing pattern of the lens module 30 is to produce different magnetic levitation forces by controlling the current passed through a coil 180, and accordingly to move the magnetic permeable internal ring 160 and the lens 110 up and down along axis Y. The focusing speed of the lens module 30 is slow, and after focusing, current has to be supplied to the coil 180 continuously to prevent the elasticity g of a spring 140 from moving the magnetic permeable internal ring 160 downwards and further to maintain the position of the lens 110. Thus, the lens module 30 consumes more electricity. In addition, to fix the position of the lens 110 on axis X with electromagnetic force, the problem of the lens 110 being tilted may be caused. Moreover, the performance of the lens module 30 in vibration test or falling test is not ideal.

Referring to FIG. 3B, in a conventional lens module 40, a lens 110 is inserted into a magnetic permeable internal ring 160', and the magnetic permeable internal ring 160' is prevented from moving about by a leading rod 185 to fix the position of the lens 110 on axis X. Besides, a sensor 190 is used for detecting the position of the magnetic permeable internal ring 160' on axis Y and transmitting signal back to an application specific integrated circuit (ASIC) 195. The ASIC 195 drives the coil 180 according to the position of the magnetic permeable internal ring 160' so as to move the magnetic permeable internal ring 160' and the lens 110 to expected position and further to complete a focusing operation. It is noted that the manufacturing cost of the lens module 40 is high even though no current is continuously provided to the coil 180 after focusing.

Figure 4:
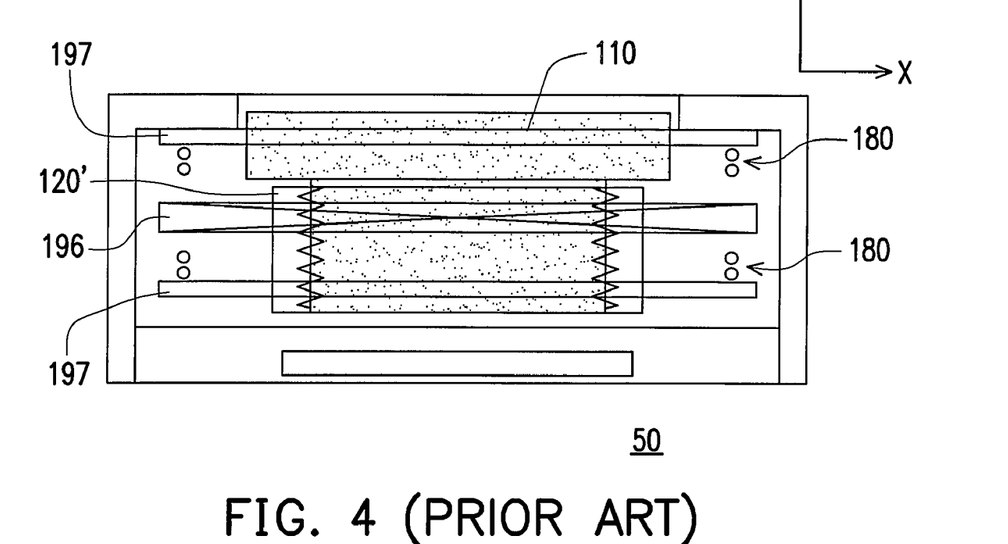
FIG. 4 is a diagram of a conventional two-stage auto focus lens module.

Referring to FIG. 4, in a conventional two-stage electrical focusing lens module 50, a lens 110 is inserted into an internal ring 120', and an annular magnet 196 is disposed outside of the internal ring 120'. The focusing pattern of the lens module 50 is as following: attraction or repellent force is produced between a coil 180 and the annular magnet 196 by changing the direction of the current provided to the coil 180 for driving the annular magnet 196, the internal ring 120', and the lens 110 to move to the top end or the bottom end along axis Y. Besides, a magnetic permeable sheet metal 197 is magnetized partially, thus, while it is stopped to provide current to the coil 180 after focusing, if the lens 110 is moved to the top end, attraction force produces between the top magnetic permeable sheet metal 197 and the annular magnet 196 to fix the lens 110 at the top. Similarly, if the lens 110 is moved to the bottom, attraction force will be produced between the bottom magnetic permeable sheet metal 197 and the annular magnet 196 to fix the lens 110 at the bottom. However, the lens module 50 has only two-stage focusing function and the size thereof is large. Moreover, the manufacturing cost of the lens module 50 is increased by the high cost of the annular magnet 196.

SUMMARY OF THE INVENTION

Accordingly, the present invention is directed to provide a lens module having multi-stage focusing function and of lower cost and smaller size.

To achieve the aforementioned and other objectives, the present invention provides a lens module including a base, a sleeve, a lens, a magnetic permeable column, a coil supporter, a coil, and a magnet set. The base has a bottom having a plurality of bumps, and the sleeve is disposed on the bumps rotatably. The lens is disposed in the sleeve, and the magnetic permeable column is disposed in the base and beside the sleeve. Two ends of the magnetic permeable column have a distance away from the bottom respectively. The coil supporter has two opposite holes, and the coil is disposed between the holes. The magnetic permeable column is inserted into the holes and the coil. The coil supporter is coupled to the sleeve, and the magnet set is disposed beside the coil. Besides, the sleeve has a plurality of step portions. Each of the step portions includes a plurality of steps, and a difference of the height is disposed between each two step. Each bump is in contact with one of the steps of the corresponding step portion. In addition, when a current is passed through the coil, the electromagnetic force produced between the coil and the magnet set is suitable for moving the coil along the magnetic permeable column, so as to push the coil supporter and rotate the sleeve accordingly.

The present invention further provides a lens module including a base, a sleeve, a lens, a magnet set, a coil supporter, and a coil. The base has a bottom having a plurality of bumps, and the sleeve is disposed on the bumps rotatably. The lens is disposed in the sleeve, and the magnet set is disposed in the base and beside the sleeve. Two ends of the magnet set are at a distance away from the bottom of the base. The coil supporter has two opposite holes. The coil supporter is coupled to the sleeve. The coil is disposed between the holes, and the magnet set is inserted into the holes and the coil. Besides, the sleeve has a plurality of step portions. Each of the step portions has a plurality of steps, and a difference of height is disposed between each two steps. Each bump is in contact with one of the steps of the corresponding step portion. The magnet set includes a first magnet and a second magnet, wherein the first magnet has a first end and an opposite second end, and the second magnet has a third end and an opposite fourth end. The first end is connected to the third end, and the second end and the fourth end are respectively connected to the base. The magnetic pole of the first and the third end is a first magnetic pole, and the magnetic pole of the second and the fourth end is a second magnetic pole. In addition, when a current is passed through the coil, the electromagnetic force produced between the coil and the magnet set is suitable for moving the coil along the magnet set, so as to push the coil supporter and rotate the sleeve accordingly.

According to the present invention, the sleeve is rotated by the moving of the coil supporter, so as to change the step in contact with the bumps of the annular carrier, and furthermore, to accomplish the purpose of focus adjustment. Since the structure of the lens module in the present invention is very simple, the material cost and the assembly cost of the device is reduced, and the size of the device is smaller. Moreover, no current has to be provided to the coil after focusing, so that the power consumption of the device can be reduced.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected" and "coupled" and variations thereof herein are used broadly and encompass direct and indirect connections, couplings. Similarly, the terms "facing," "faces" and variations thereof herein are used broadly and encompass direct and indirect facing, and "inserted into" and variations thereof herein are used broadly and encompass directly and indirectly "inserted into". Therefore, the description of "A" component facing "B" component herein may contain the situations that "A" component facing "B" component directly or one or more additional components is between "A" component and "B" component. Also, the description of "A" component "inserted into" "B" component herein may contain the situations that "A" component is directly "inserted into" "B" component or one or more additional components is between "A" component and "B" component. Accordingly, the drawings and descriptions will be regarded as illustrative in nature and not as restrictive.

Figure 5A:
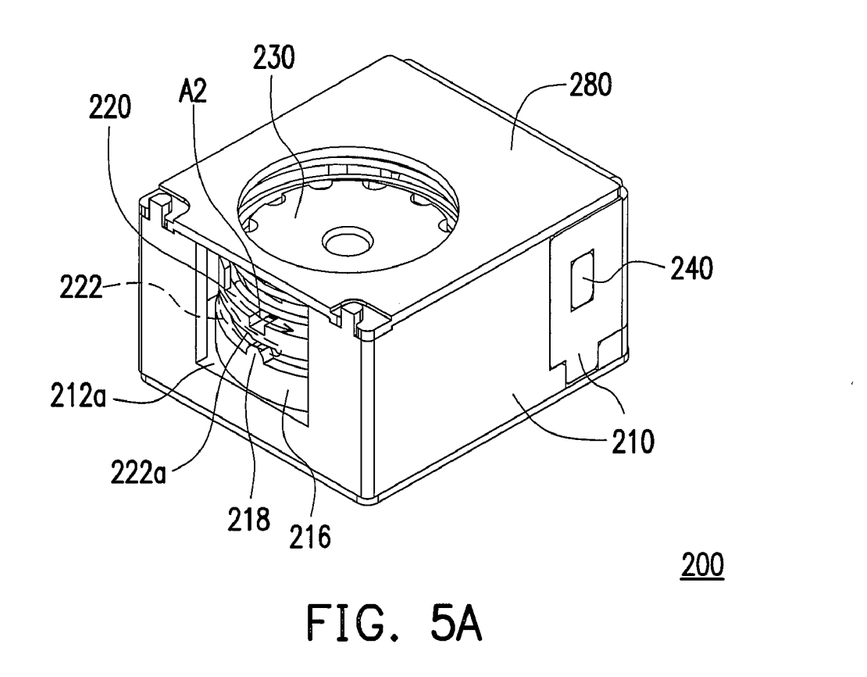
FIG. 5A is a three-dimensional diagram of a lens module according to an embodiment of the present invention.
Figure 5B:
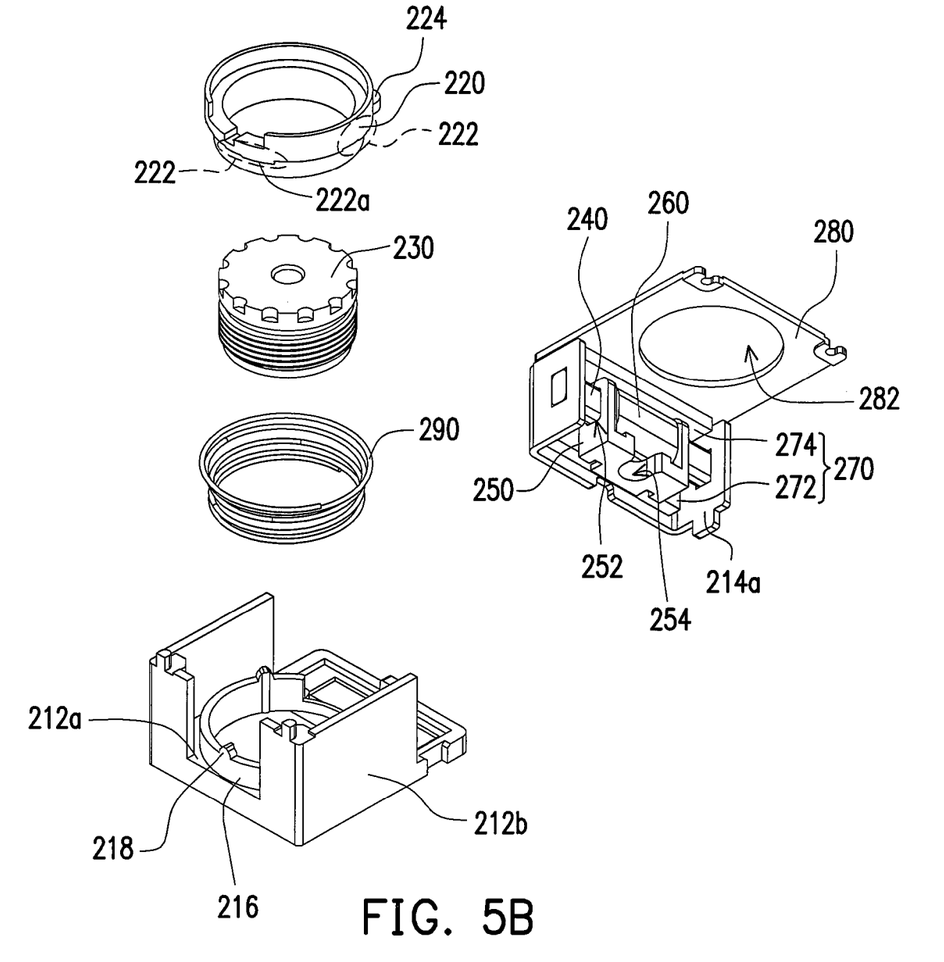
FIG. 5B is a exploded diagram of the lens module in FIG. 5A.
Figure 5C:
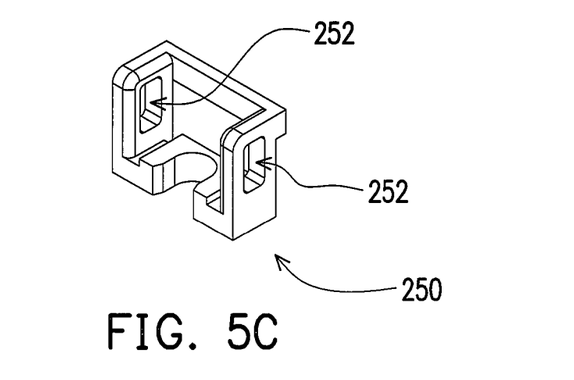
FIG. 5C is a three-dimensional diagram of the coil supporter in FIG. 5A.

Referring to FIGS. 5A~5C, in the present embodiment, the lens module 200 includes a base 210, a sleeve 220, a lens 230, a magnetic permeable column 240, a coil supporter 250, a coil 260, a magnet set 270, and a cover 280. The base 210 has a bottom 212a and a plurality of sidewalls 212b and 214a connected to the bottom 212a. The material of the bottom 212a and the sidewalls 212b is insulating material and the material of the sidewalls 214a is metal. The bottom 212a has an annular carrier 216 and a plurality of bumps 218. The bumps 218 are, for example, disposed on the annular carrier 216, and the sleeve 220 is rotatably disposed on the bumps 218. The lens 230 is disposed in the sleeve 220. The magnetic permeable column 240 may be a magnetic permeable steel column disposed in the base 210 and beside the sleeve 220. The two ends of the magnetic permeable column 240 are at a distance away from the bottom 212a of the base 210, and the magnetic permeable column 240 is connected between the two opposite sidewalls 214a of the base 210. The coil supporter 250 has two opposite holes 252, and the coil 260 is disposed between the holes 252. The magnetic permeable column 240 is inserted into the holes 252 and the coil 260. The coil supporter 250 is coupled to the sleeve 220, and the magnet set 270 is disposed beside the coil 260. Besides, the sleeve 220 has a plurality of step portions 222 around its periphery. Each of the step portions 222 includes a plurality of steps 222a, and there are height differences between various steps 222a. Each of the bumps 218 is in contact with one of the steps 222a of the corresponding step portion 222. The cover 280 is disposed on the base 210 and opposite to the bottom 212a of the base 210, and is in contact with the sidewalls 212b and 214a to cover the base 210. The cover 280 further has an opening 282 for exposing the lens 230.

Figure 6:
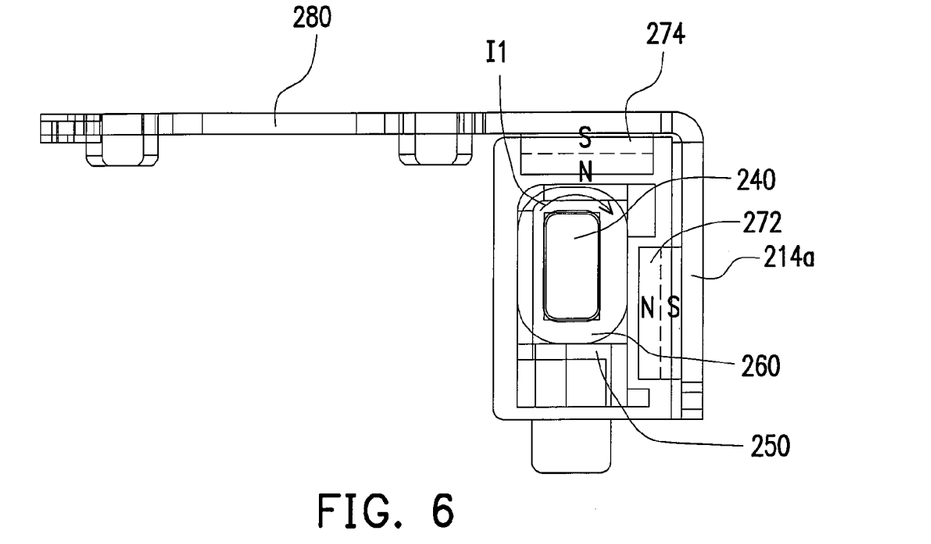
FIG. 6 is a diagram illustrating the magnetic circuit disposition of the lens module in FIG. 5A.

In addition, referring to FIGS. 5B and 6, the magnet set 270 includes a first magnet 272 and a second magnet 274, wherein the first magnet 272 is disposed at one side of the coil 260 opposite to the sleeve 220, and the second magnet 274 is disposed at the side of the coil 260 opposite to the bottom 212a. In specific, the first magnet 272 may be fixed on the sidewall 214a of the sleeve 220, and the second magnet 274 may be disposed on the cover 280. The coil 260 is disposed between the first magnet 272 and the sleeve 220, and between the second magnet 274 and the bottom 212a of the base 210. In addition, the magnetic pole of a surface of the first magnet 272 and a surface of the second magnet 274 facing the coil 260 is a first magnetic pole. Another surface of the first magnet 272 connected to the sidewall 214a and another surface of the second magnet 274 connected to the cover 280 is a second magnetic pole. The first magnetic pole may be one of S pole and N pole, and the second magnetic pole is N pole when the first magnetic pole is S pole, and the second magnetic pole is S pole when the first magnetic pole is N pole. In the present embodiment, the first magnetic pole is, for example, N pole, and the second magnetic pole is, for example, S pole.

Figure 7:
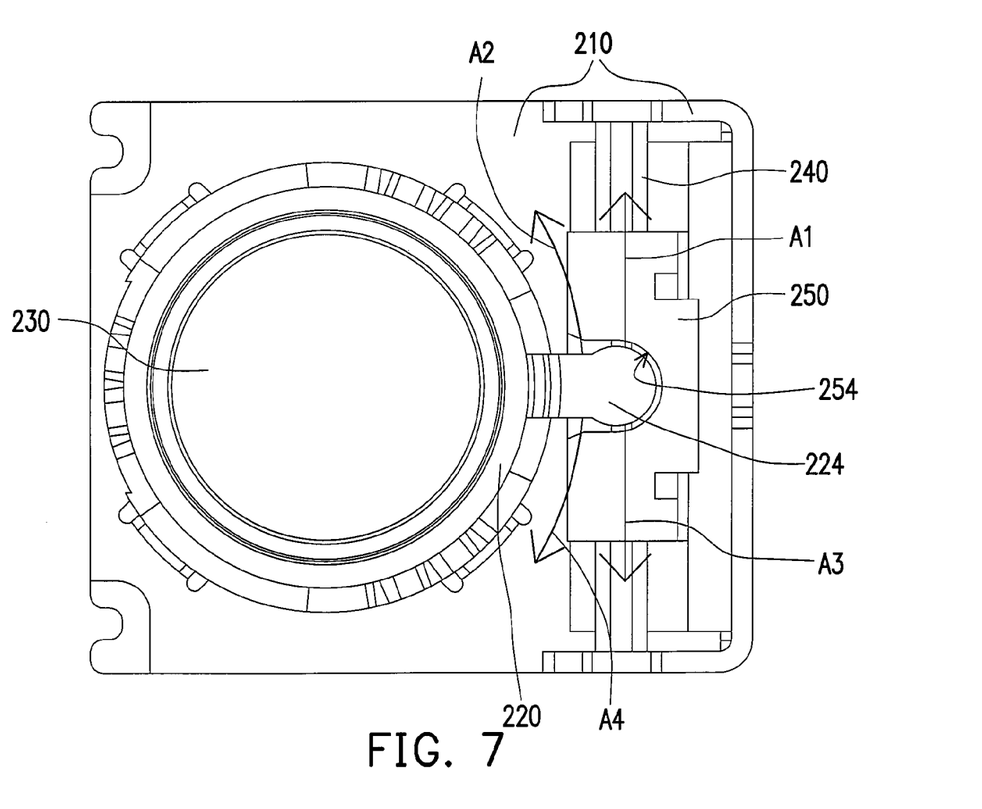
FIG. 7 is a diagram illustrating the coupling between the sleeve and the coil supporter in FIG. 5B.

Referring to FIGS. 5B and 7, the coil supporter 250 has, for example, a first coupling portion 254, and an external sidewall of the sleeve 220 has, for example, a second coupling portion 224 corresponding and coupled to the first coupling portion 254. The first coupling portion 254 may be a slot, and the second coupling portion 224 may be a tenon.

Referring to FIGS. 5A, 6, and 7, when a current is passed through the coil 260, the electromagnetic force produced between the coil 260 and the magnet set 270 is suitable for moving the coil 260 along the magnetic permeable column 240, so as to push the coil supporter 250 and rotate the sleeve 220 accordingly. To be specific, in the present embodiment, the moving direction of the coil 260 moving along the magnetic permeable column 240 can be controlled by controlling the direction of the current passed through the coil 260. When a current $I_1$ is passed through the coil 260, the coil 260 moves along the direction denoted by arrow A1, the coil supporter 250 is pushed to move along the direction of arrow A1 accordingly. Since the first coupling portion 254 of the coil supporter 250 is coupled to the second coupling portion 224 of the sleeve 220, the movement of the coil supporter 250 links the sleeve 220 to rotate in the direction of the arrow A2. Moreover, when the sleeve 220 rotates along the direction of arrow A2, the step 222a in contact with the bumps 218 on the annular carrier 216 changes. Thus, the distance of the sleeve 220 and the lens 230 disposed in the sleeve 220 to the bottom 212a of the base 210 changes accordingly so that the purpose of focusing can be accomplished. Similarly, when a current of opposite direction to the current $I_1$ is passed through the coil 260, the coil supporter 250 moves along the direction of arrow A3 to rotate the sleeve 220 along the direction of arrow A4. Thus, the distance of the sleeve 220 and the lens 230 disposed in the sleeve 220 to the bottom 212a of the base 210 changes accordingly, so as to accomplish the purpose of focusing.

In the present embodiment, the sleeve 220 is rotated a large enough angle which allows the next step 222a to get in contact with the bumps 218 by only attacking the second coupling portion 224 of the sleeve 220 with the coil supporter 250. Thus, no elaborate circuit control or mechanism of high precision is required in the lens module 200 in the present embodiment, instead the function of precisely focusing can be achieved by simply controlling the duration of current passing, so that the cost of control circuit can be reduced. Moreover, since each step portion 222 has a plurality of steps 222a, the lens module 200 has multi-stage focusing function. Furthermore, electricity consumption can be reduced since no current has to be passed through the coil 260 constantly after focusing. Besides, the lens module 200 in the present embodiment has simple structure, so that the size thereof can be reduced. Further, since the magnetic devices are easily produced and assembled, the fabricating cost thereof can be reduced.

It should be mentioned that to increase the stability of the lens 230 as zooming, a spring 290 can be disposed additionally in the lens module 200. The spring 290 is sustained between the cover 280 and the sleeve 220 so that the lens 230 can be prevented from being tilted as zooming.

Figure 8:
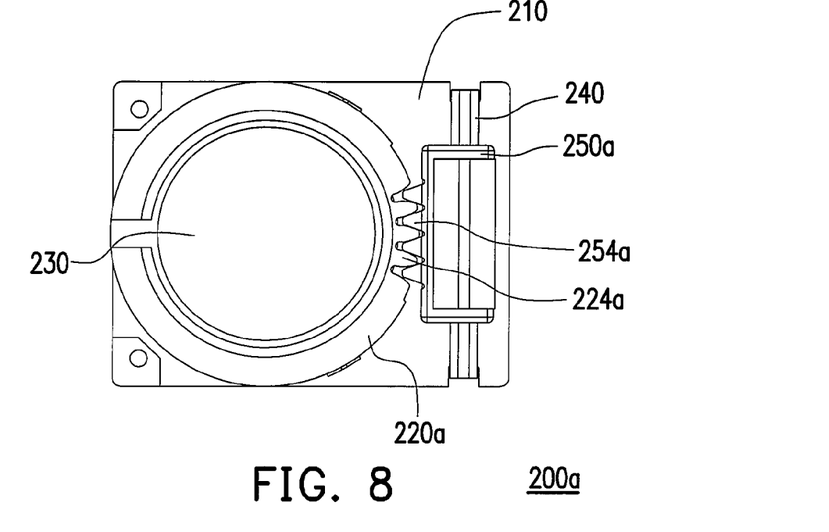
FIG. 8 is a diagram illustrating the coupling between the sleeve and the coil supporter of a lens module according to another embodiment of the present invention.

Moreover, in the present embodiment, the first coupling portion may also be a tenon while the second coupling portion may also be a slot, and the coupling manner between the coil supporter 250 and the sleeve 220 is not limited in the present invention. Referring to FIG. 8 for another coupling pattern between the coil supporter and the sleeve, the first coupling portion 254a of the coil supporter 250a of the lens module 200a is a rack, and the second coupling portion 224a of the sleeve 220a is a plurality of teeth arranged on the external sidewall of the sleeve 220a. When the coil supporter 250a moves, the coil supporter 250a links the sleeve 220a to rotate by the cooperation between the rack and the teeth, so as to accomplish the purpose of focusing. Moreover, the focusing pattern and advantages of the lens module 200a are similar to those of the lens module 200, therefore will not be described herein.

Figure 9:
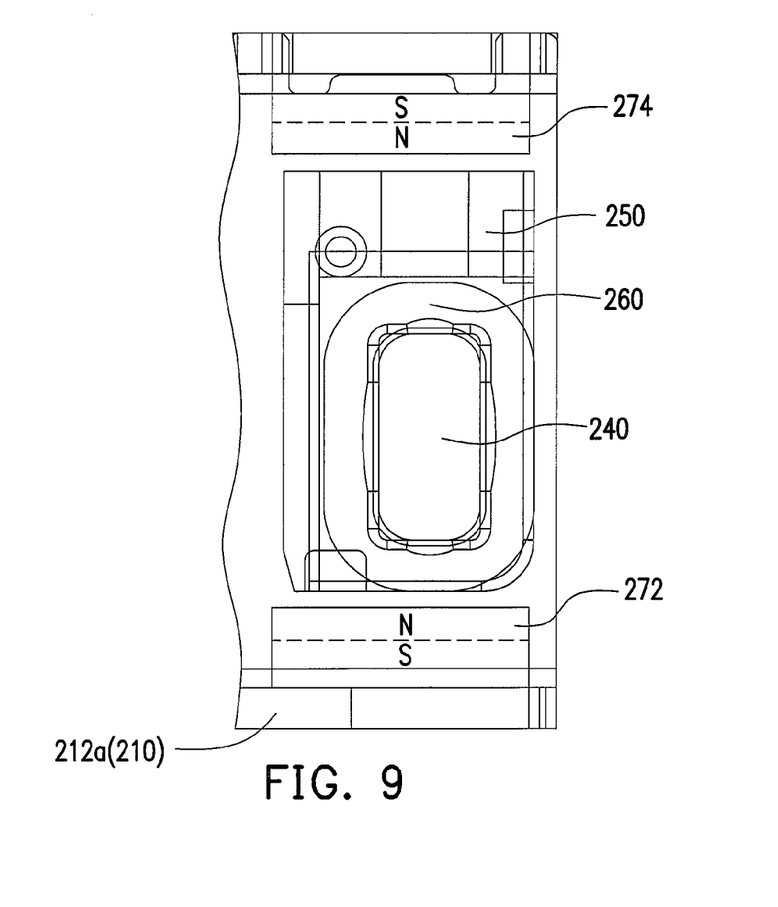
FIG. 9 is a diagram illustrating the magnetic circuit disposition of a lens module according to another embodiment of the present invention.

In the present invention, the relative positions of the first magnet 272 and the second magnet 274 are not limited to the embodiment shown in FIG. 6. Refer to FIG. 9, which is a diagram illustrating the magnetic circuit disposition of a lens module according to another embodiment of the present invention. In the present invention, the first magnet 272 and the second magnet 274 may also be disposed at two opposite sides of the coil 260. Wherein, the first magnet 272 is located between the coil 260 and the bottom 212a of the base 210. Besides, the magnetic pole of a surface of the first magnet 272 and a surface of the second magnet 274 facing the coil 260 is, for example, the first magnetic pole (for example, N pole).

Referring to FIGS. 10A~10D, in another embodiment of the present invention, the lens module 200b includes a base 210b, a sleeve 220b, a lens 230 (not shown), a coil supporter 250b, a coil 260, a magnet set 270b, and a cover 280. The base 210b has a bottom 212a', and the bottom 212a' has a plurality of bumps 218. The sleeve 220b is rotatably disposed on the bumps 218. The lens 230 is disposed in the sleeve 220b, and the magnet set 270b is disposed in the base 210b and beside the sleeve 220b. The two ends of the magnet set 270b are at a distance away from the bottom 212a' of the base 210b. The coil supporter 250b has two opposite holes 252, and the coil supporter 250b is coupled to the sleeve 220b. The coil 260 is located between the holes 252, and the magnet set 270b is inserted into the holes 252 and the coil 260. Besides, the base 210b further has, for example, an annular carrier 216, and the bumps 218 are located at the periphery of the annular carrier 216. The sleeve 220b is disposed on the annular carrier 216 and the bumps 218, and the sleeve 220b has a plurality of step portions 222. Each step portion 222 includes a plurality of steps 222a, and there are height differences between the various steps 222a, and each bump 218 is in contact with one of the steps 222a of the corresponding step portion 222. The magnet set 270b includes a first magnet 272' and a second magnet 274', wherein the first magnet 272' has a first end 272a and an opposite second end 272b, and the second magnet 274' has a third end 274a and an opposite fourth end 274b. The first end 272a is connected to the third end 274a, and the second end 272b and the fourth end 274b are respectively connected to the second portion 214' of the base 210b. The magnetic pole of the first end 272a and the third end 274a is a first magnetic pole, and the magnetic pole of the second end 272b and the fourth end 274b is a second magnetic pole.

Figure 10A:
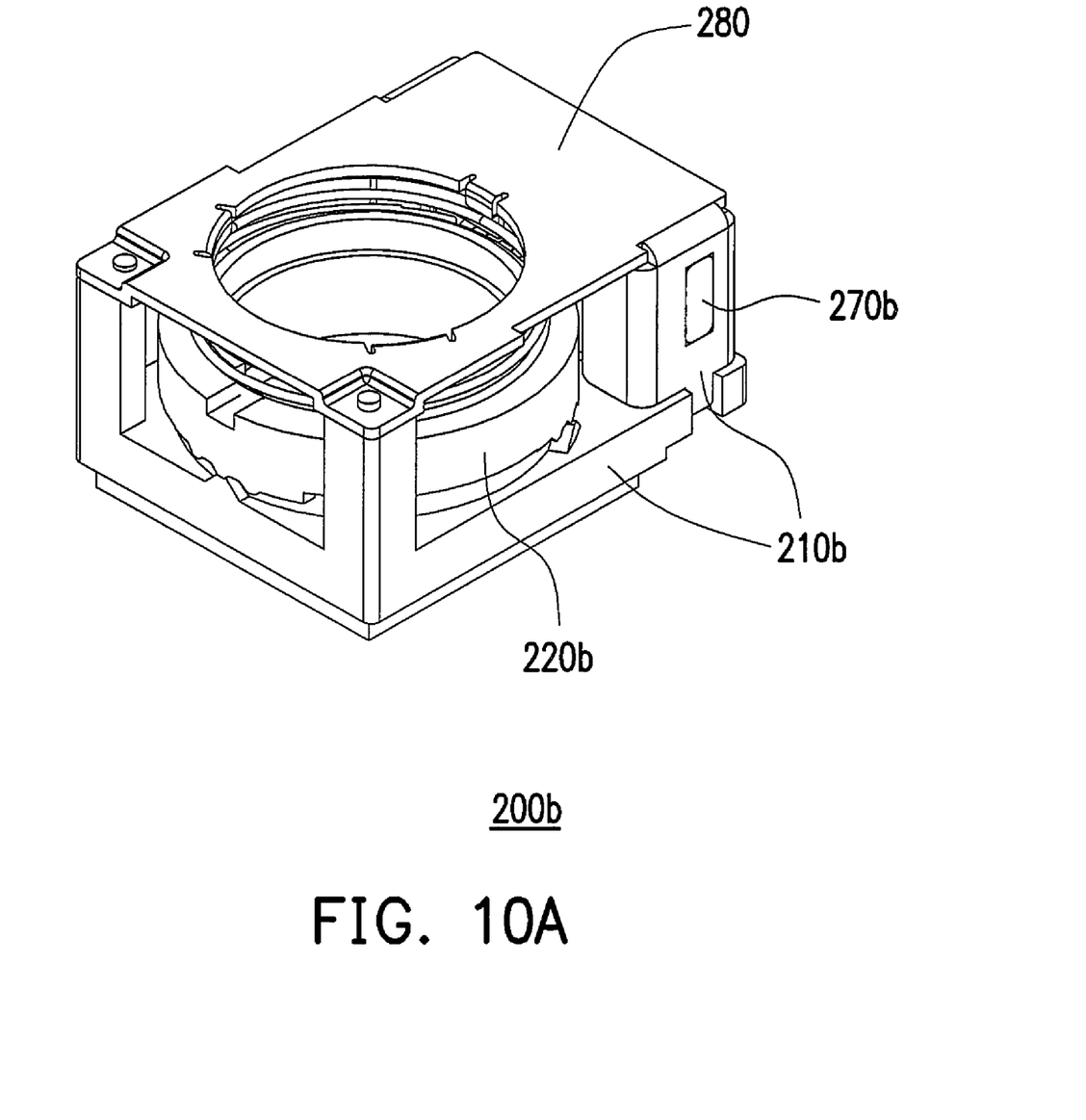
FIG. 10A is a three-dimensional diagram of a lens module according to another embodiment of the present invention.
Figure 10B:
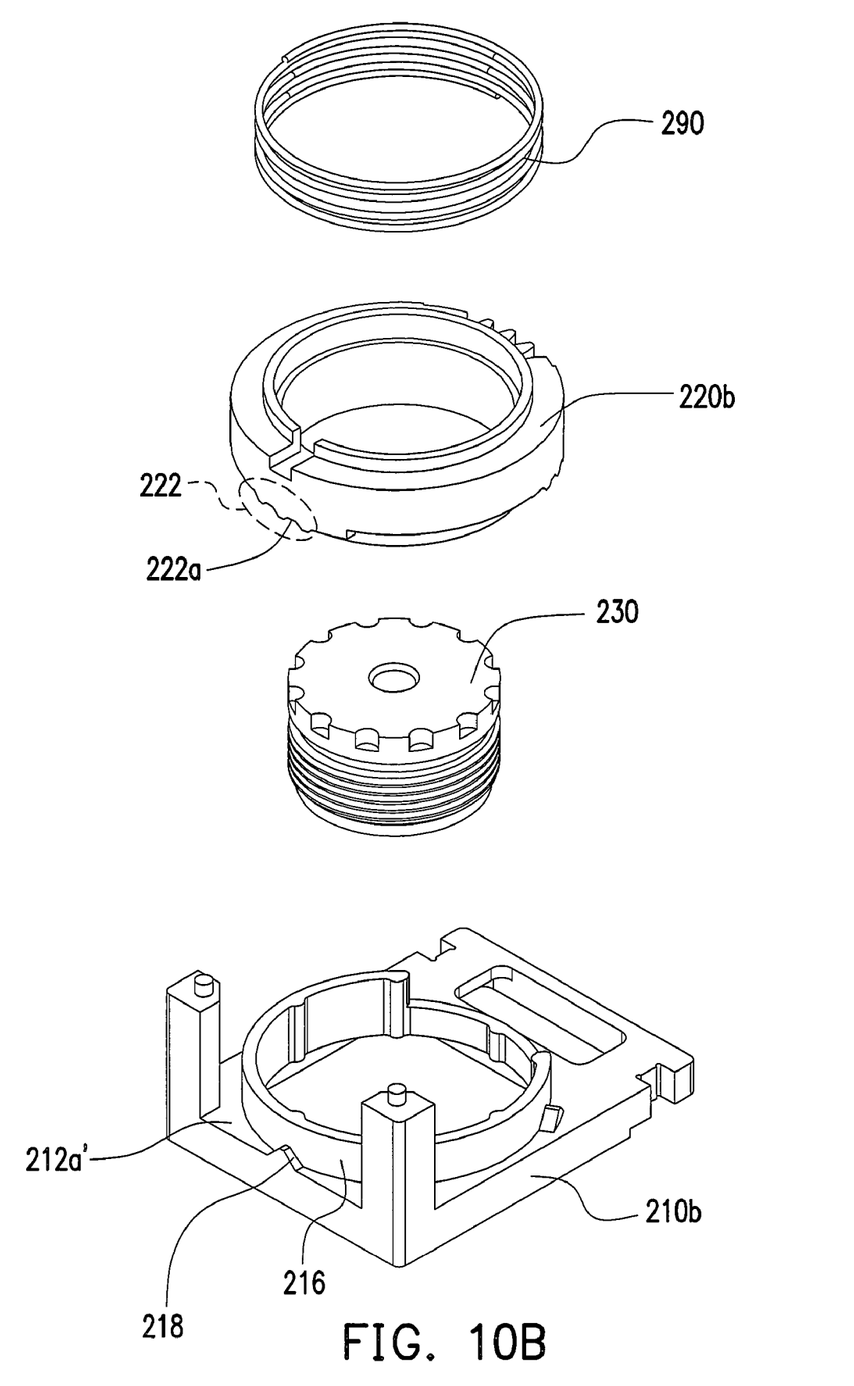
FIG. 10B is a exploded diagram of the lens module in FIG. 10A.

The cover 280 disposed on the base 210b is opposite to the bottom 212a' of the base 210b to cover the base 210b. The cover 280 has an opening 282 for exposing the lens 230. Besides, the first magnetic pole may be one of S pole and N pole, and the second magnetic pole is N pole when the first magnetic pole is S pole, and the second magnetic pole is S pole when the first magnetic pole is N pole. In the present embodiment, the first magnetic pole is N pole, and the second magnetic pole is S pole.

Figure 10C:
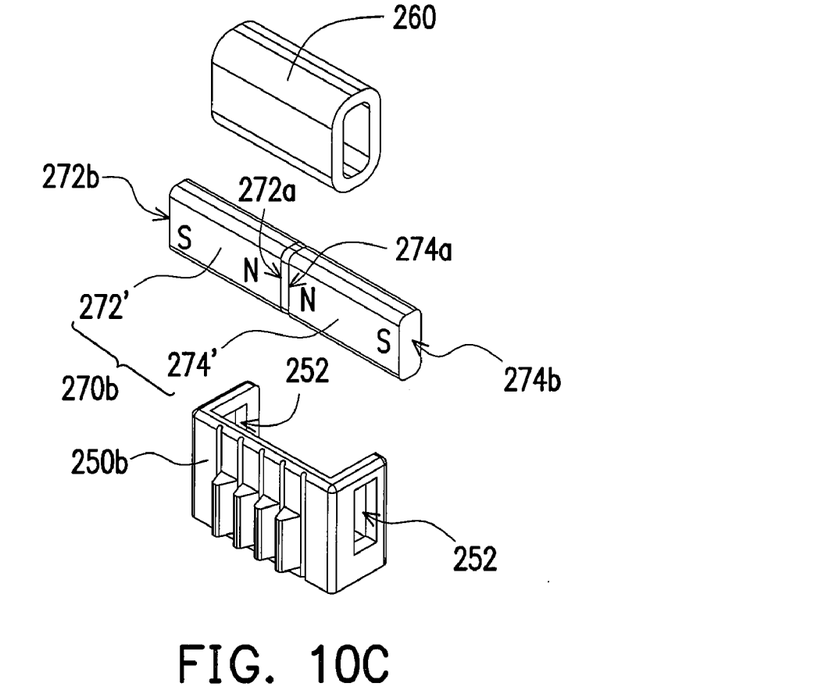
FIG. 10C is a three-dimensional diagram of the coil supporter in FIG. 10A.
Figure 10D:
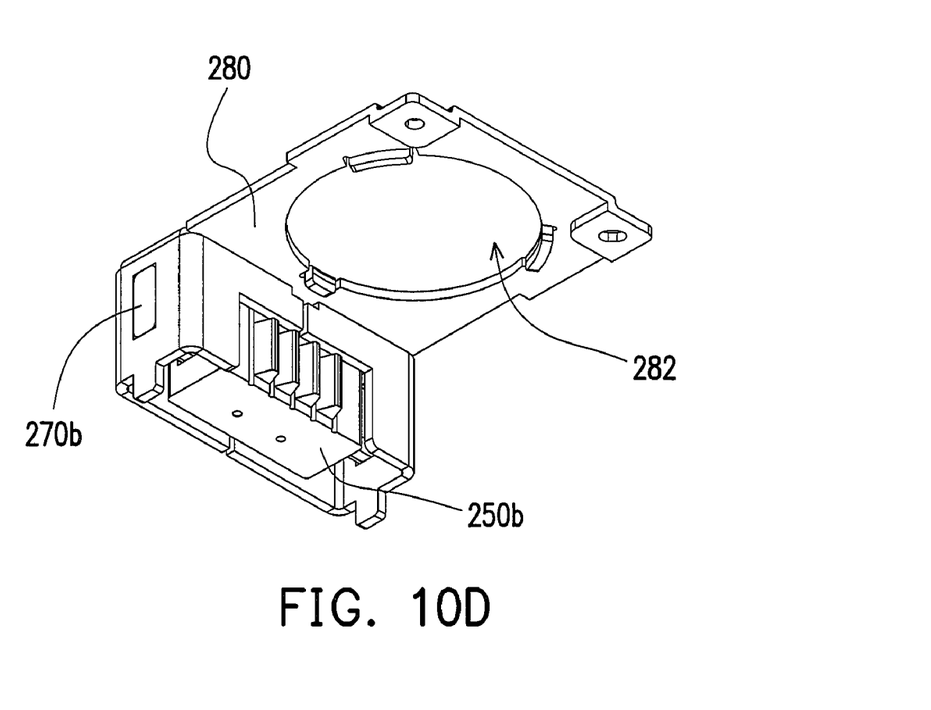
FIG. 10D is a diagram of assembly of some components of the lens module in FIG. 10A.

The coil supporter 250b has, for example, a first coupling portion 254a. The external sidewall of the sleeve 220b has, for example, a second coupling portion 224a corresponding to the first coupling portion 254a. The first coupling portion 254a and the second coupling portion 224a are coupled together. The first coupling portion 254a may be a rack, and the second coupling portion 224a may be a plurality of teeth arranged on the external sidewall of the sleeve 220b. The coupling manner between the first coupling portion 254a and the second coupling portion 224a is similar to that illustrated in FIG. 8, and will not be illustrated with another diagram. Moreover, in the present embodiment, the coupling between the coil supporter 250b and the sleeve 220b may also be the combination of a tenon and a slot.

In the present embodiment, the focusing manner and advantages of the lens module 200b are similar to those of the lens module 200 as shown in FIG. 5A, and will not be described herein. Besides, a spring 290 can be disposed additionally between the cover 280 and the sleeve 220b to make the lens 230 more stable as zooming.

It should be noted that in the lens module 200b, the bumps 218 may also be located on the annular carrier 216 and only the appearance of the sleeve 220b needs to be adjusted accordingly. Similarly, in the lens module 200 illustrated in FIG. 5A, the bumps 218 may also be located at the periphery of the annular carrier 216, and only the appearance of the sleeve 220 needs to be adjusted accordingly.

In overview, the lens module in the present invention has at least following advantages:

1. The lens module in the present invention has simple structure so that the material cost and the assembly cost of the device can be reduced, and the device has smaller size.

2. No current is supplied to the coil after focusing has been done, so that power consumption can be reduced.

3. According to the lens module of the present invention, no elaborate circuit control or mechanism of high precision is required, thus the cost of control circuit can be reduced.

4. The lens module has multi-stage focusing function since each of the step portions has a plurality of steps.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A lens module, comprising:
   a base having a bottom, the bottom having a plurality of bumps;
   a sleeve disposed on the bumps rotatably, and having a plurality of step portions, wherein each of the step portions comprises a plurality of steps, and a difference of height is disposed between each two steps, and each of the bumps is in contact with one of the steps of the corresponding step portion;
   a lens disposed in the sleeve;
   a magnetic permeable column disposed in the base and beside the sleeve, wherein two ends of the magnetic permeable column have a distance away from the bottom respectively;
   a coil supporter having two opposite holes, the magnetic permeable column being inserted into the holes, wherein the coil supporter is coupled to the sleeve;
   a coil disposed between the holes, the magnetic permeable column being inserted into the coil; and
   a magnet set disposed beside the coil, wherein when a current is passed through the coil, the electromagnetic force produced between the coil and the magnet set moves the coil along the magnetic permeable column to push the coil supporter and rotate the sleeve accordingly.

2. The lens module as claimed in claim 1, wherein the magnet set comprises:
   a first magnet disposed at one side of the coil opposite to the sleeve, the magnetic pole of a surface of the first magnet facing the coil being a first magnetic pole; and
   a second magnet disposed at one side of the coil opposite to the bottom, the magnetic pole of a surface of the second magnet facing the coil being the first magnetic pole.

3. The lens module as claimed in claim 1, wherein the magnet set comprises:
   a first magnet disposed between the coil and the bottom of the base, wherein the magnetic pole of a surface of the first magnet facing the coil is a first magnetic pole; and
   a second magnet, the second magnet and the first magnet being respectively disposed at the opposite two sides of the coil, wherein the magnetic pole of a surface of the second magnet facing the coil is the first magnetic pole.

4. The lens module as claimed in claim 1, wherein the coil supporter has a first coupling portion, an external sidewall of the sleeve has a second coupling portion corresponding to the first coupling portion, and the first coupling portion and the second coupling portion are coupled together.

5. The lens module as claimed in claim 4, wherein the first coupling portion is a slot, and the second coupling portion is a tenon.

6. The lens module as claimed in claim 4, wherein the first coupling portion is a rack, and the second coupling portion is a plurality of teeth arranged on the external sidewall of the sleeve.

7. The lens module as claimed in claim 1, wherein the magnetic permeable column is a magnetic permeable steel column.

8. The lens module as claimed in claim 1 further comprising a cover disposed on the base and opposite to the bottom of the base, wherein the cover has an opening for exposing the lens.

9. The lens module as claimed in claim 8 further comprising a spring sustained between the cover and the sleeve.

10. The lens module as claimed in claim 1, wherein the bottom of the base further has an annular carrier, and the bumps are located on a top surface of the annular carrier.

11. The lens module as claimed in claim 1, wherein the bottom of the base further has an annular carrier, and the bumps are located at the periphery of the annular carrier.

12. A lens module, comprising:
    a base having a bottom, the bottom having a plurality of bumps;
    a sleeve disposed on the bumps and having a plurality of step portions, wherein each of the step portions comprises a plurality of steps, and a difference of height is disposed between each two steps, and each of the bumps is in contact with one of the steps of the corresponding step portion;
    a lens disposed in the sleeve;
    a magnet set disposed in the base and beside the sleeve, two ends of the magnet set having a distance away from the bottom respectively, wherein the magnet set comprises:
       a first magnet having a first end and an opposite second end; and
       a second magnet having a third end and an opposite fourth end, the first end being connected to the third end, the second and the fourth end being respectively connected to the base, wherein the magnetic pole of the first end and the third end is a first magnetic pole, and the magnetic pole of the second end and the fourth end is a second magnetic pole;
    a coil supporter having two opposite holes, the magnet set being inserted into the holes, wherein the coil supporter is coupled to the sleeve; and
    a coil disposed between the holes, the magnet set being inserted into the coil, wherein when a current is passed through the coil, the electromagnetic force produced between the coil and the magnet set moves the coil along the magnet set, so as to push the coil supporter and rotate the sleeve accordingly.

13. The lens module as claimed in claim 12, wherein the coil supporter has a first coupling portion, an external sidewall of the sleeve has second coupling portion corresponding to the first coupling portion, and the first coupling portion and the second coupling portion are coupled together.

14. The lens module as claimed in claim 13, wherein the first coupling portion is a slot, and the second coupling portion is a tenon.

15. The lens module as claimed in claim 13, wherein the first coupling portion is a rack, and the second coupling portion is a plurality of teeth arranged on the external sidewall of the sleeve.

16. The lens module as claimed in claim 12 further comprising a cover disposed on the base and opposite to the bottom of the base, wherein the cover has an opening for exposing the lens.

17. The lens module as claimed in claim 16 further comprising a spring sustained between the cover and the sleeve.

18. The lens module as claimed in claim 12, wherein the bottom of the base further has an annular carrier, and the bumps are located on a top surface of the annular carrier.

19. The lens module as claimed in claim 12, wherein the bottom of the base further has an annular carrier, and the bumps are located at the periphery of the annular carrier.

\* \* \* \* \*